April 29, 1952 W. A. HUMPHREY 2,594,441
BREAD TOASTING APPARATUS AND CONTROL
Filed Jan. 31, 1948 3 Sheets-Sheet 1

INVENTOR.
Warren A. Humphrey
BY
Harry S. Ducasse
ATTORNEY.

April 29, 1952 W. A. HUMPHREY 2,594,441
BREAD TOASTING APPARATUS AND CONTROL
Filed Jan. 31, 1948 3 Sheets-Sheet 2

INVENTOR.
Warren A. Humphrey
BY
ATTORNEY.

April 29, 1952 W. A. HUMPHREY 2,594,441
BREAD TOASTING APPARATUS AND CONTROL
Filed Jan. 31, 1948 3 Sheets-Sheet 3
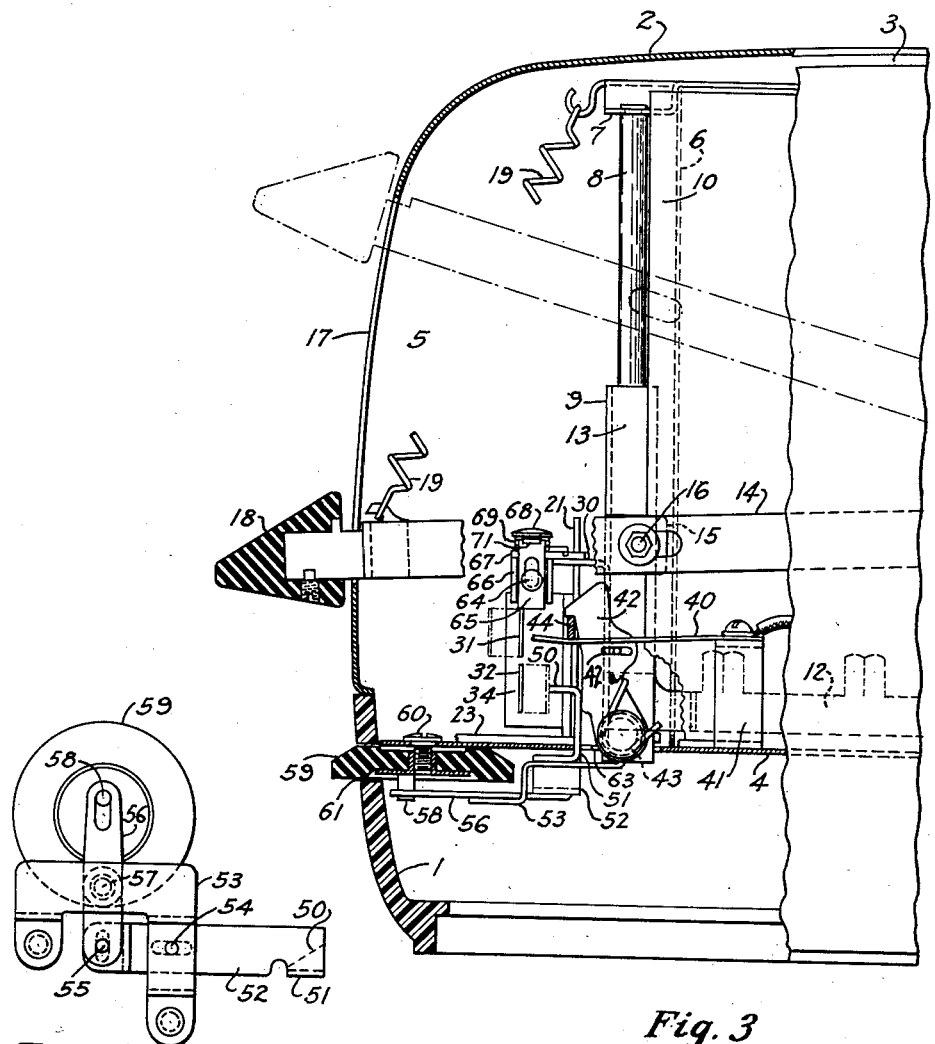
Fig. 3
Fig. 4
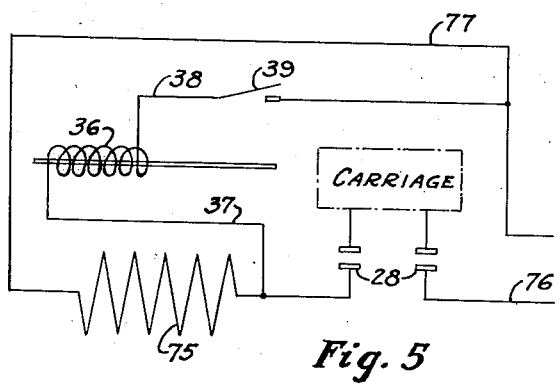
Fig. 5
INVENTOR.
Warren A. Humphrey
BY
Harry S. Dunarr
ATTORNEY.

Patented Apr. 29, 1952

2,594,441

UNITED STATES PATENT OFFICE 2,594,441

BREAD TOASTING APPARATUS
AND CONTROL

Warren A. Humphrey, Canton, Ohio, assignor to The Hoover Company, North Canton, Ohio, a corporation of Ohio Application January 31, 1948, Serial No. 5,583

5 Claims. (Cl. 219—19)

This invention relates to the art of toasting apparatuses and more particularly to a novel control and timing mechanism for bread toasting apparatuses.

It is a particular objective of the present invention to provide a toasting apparatus provided with a control mechanism which is simple and reliable in operation, economical to construct and assemble and which automatically and inherently compensates itself for variations in the toasting cycle induced by progressive warming of the toasting oven as toasting operations succeed each other in close time relationship.

The invention is illustrated in the accompanying drawing in which:

Figure 3 is a fragmentary side sectional elevational view of the apparatus in Figure 1;

Figure 4 is a bottom view of the manual control for dark to light toast; and

Figure 5 is a schematic wiring diagram.

Figure 1:
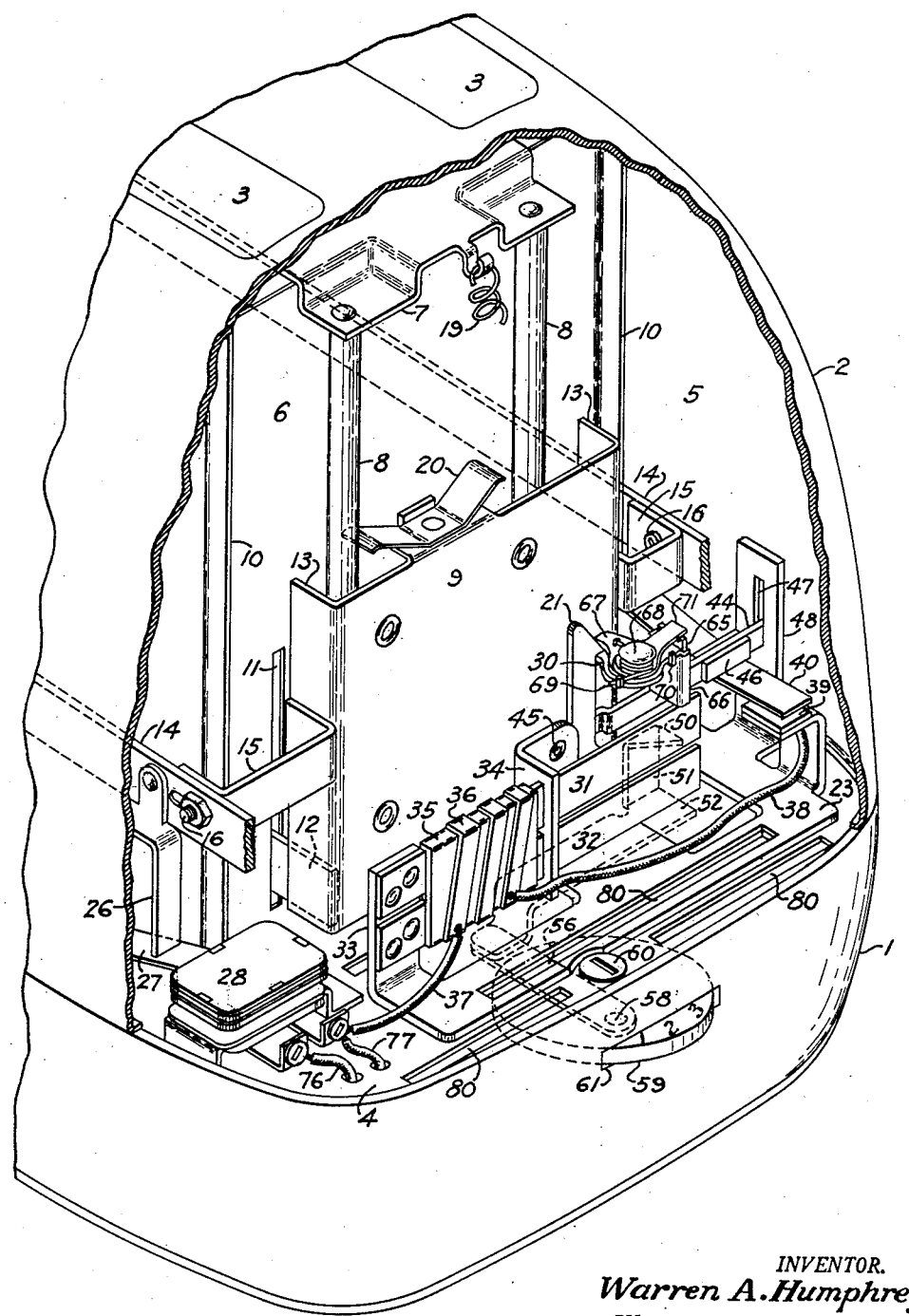
Figure 1 is a fragmentary partial sectional perspective view of the apparatus embodying the present invention.

Referring now to the drawing and first to Figure 1 thereof, the toasting apparatus comprises the usual plastic base 1, which supports and carries an outer shell 2 provided with openings 3 through which toast may be inserted into the toasting oven. A base plate 4 underlies the entire oven and the control chamber 5 positioned at one end of the toaster shell 2. The heating elements 75, see Figure 5, for the oven are arranged therein conventionally.

The inside wall of the chamber 5 is defined by an upstanding partition 6 which separates the chamber 5 from the toasting oven. The partition 6 carries a forwardly projecting plate or flange 7 which supports the upper end of a pair of vertical toast carriage guide posts 8. The posts 8 are secured at their lower ends to the base plate 4. This plate is provided with forwardly turned vertical side flanges 10 to strengthen the same.

A toast rack supporting and guide plate 9 is slidably mounted upon the vertical posts 8 by a plurality of grooved rollers 29 which engage the facing sides of the guide posts 8. The rollers 29 are pivotally secured to the rear face of the plate 9.

The plate 6 is provided with a pair of vertically extending slots 11 through which the toast supporting rack 12 projects into the toasting oven. The forward ends of the rack 12 are rigidly secured to the rearwardly turned flanges 13 of the plate 9.

The toast carriage construction is actuated by a pair of levers 14 which extend longitudinally of the toaster on opposite sides thereof outside the flanges 10 on the plate 6. These arms are pivotally secured at the end of the toaster opposite the chamber 5 as indicated in Figure 3. U-shaped securing members 15 are rigidly secured to the flanges 13 of the plate 9 and are provided with a pin and slot connection 16 with the carriage actuating levers 14. The levers 14 follow generally the inside curvature of the end wall of the shell 2 and join at the central portion thereof where they project through a suitable slot 17 in the cover 2 and support an operating handle 18 on their outer ends.

As shown in Figure 3, a tension spring 19 is secured to the plate 7 and the joined ends of the levers 14 to urge the levers 14 and their associated toast supporting mechanism into upper, toast ejecting, position. Upward movement of the toast supporting mechanism under the bias of the spring 19 is limited and cushioned by the leaf spring 20 which is secured to the top portion of the plate 9 and contacts the plate 7.

When the toast carriage is moved downward manually against the bias of the spring 19 to toasting position, a latching lug 30 rigidly secured to the front face of the plate 9 rides under and is secured by a hold-down latch 21. Latch 21 is pivotally mounted at 22 upon a supporting plate 23 which is secured to the base plate 4. A torsion spring 24 urges the latch 21 to latching position. A stop lug 25 formed on the plate 23 limits movement of the latch 21 in a latching direction under the bias of the spring 24.

Figure 2:
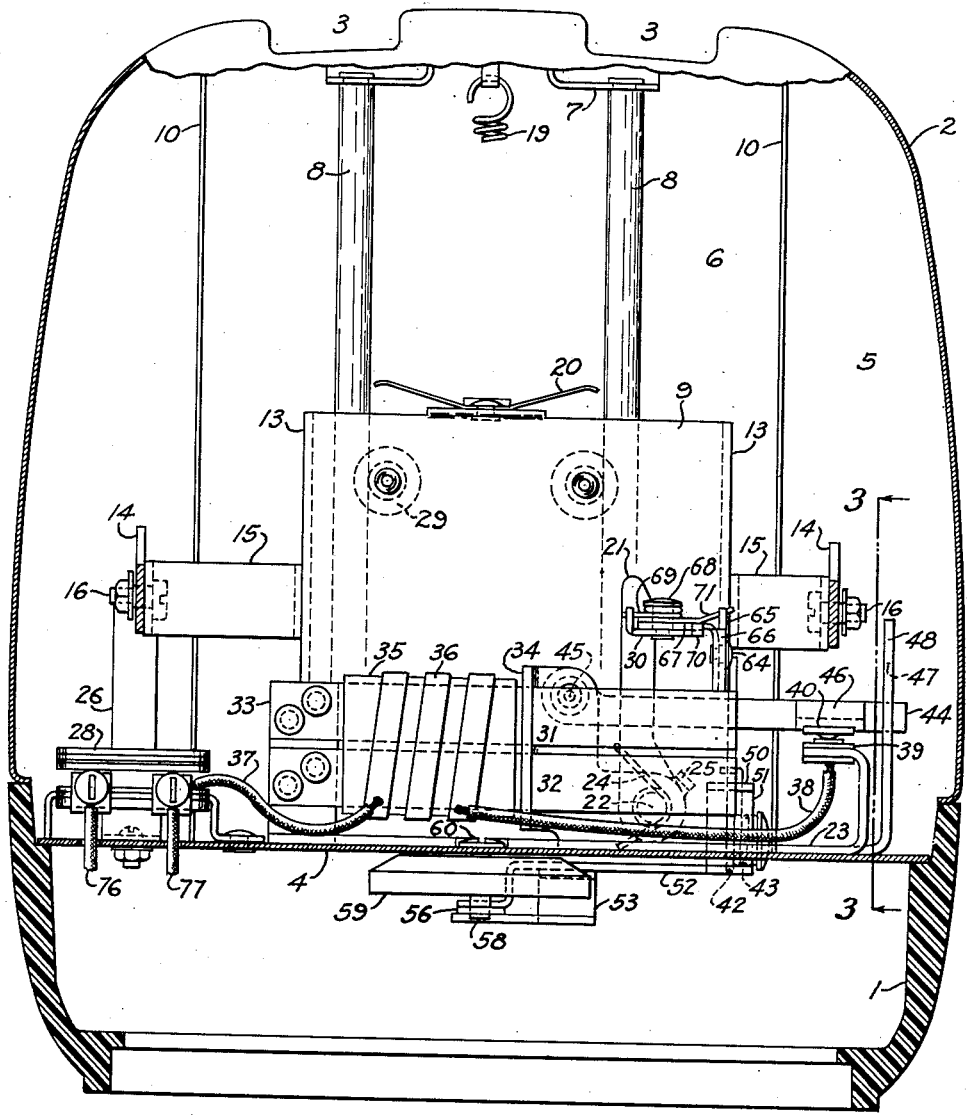
Figure 2 is an end view partially in section.

The left hand arm 14, as viewed in Figures 1 and 2, supports a downwardly projecting tongue 26 which engages a leaf spring 27 when the carriage is in latched position to close an electric switch 28. The construction is such that the leaf spring 27 biases the switch 28 to open circuit position. Switch 28 governs the energization of the heating elements 75, see Figure 5, of the toaster oven and the heating elements of the timing mechanism as will appear more clearly hereinafter.

A pair of bimetallic thermostatic elements 31 and 32 are rigidly secured at one end thereof to an upstanding support plate 33 carried by the base plate 4 of the toaster. The thermostatic elements 31 and 32 are passed through suitable slots formed in a supporting plate structure 34 secured to the base plate 4 of the toaster. The element 34 engages the thermostatic elements 31—32 at approximately their mid-point and provides a second substantially rigid support therefor. Between the supporting elements 33 and 34 the thermostatic elements are encased in electrical insulating material 35 around which is wound a ribbon type electrical heating element 36. The electrical heating element 36 is connected by the conductors 37 and 38 to the main switch 28 and a second switch 39, respectively.

The switch 39 has one contact 40 thereof in the form of a leaf spring biased to switch opening position. The spring contact 40 is insulatably mounted upon a post 41 carried by the base plate 4 of the toaster. A latch 42 is pivotally mounted upon the right hand flange 13 of the plate 9 as shown most clearly in Figure 3. This latch is urged in a counter-clockwise direction by a torsion spring 43. The latch 42 is notched to have a limited arc of movement about its pivot under the bias of the torsion spring 43. This arc of movement is limited by a pin and slot connection 42a between the latch 42 and flange 13. As the carriage structure is moved downwardly to toasting position the latch 42 engages a switch actuating lever 44 which is pivotally mounted at 45 upon the supporting plate 34. The free end of the lever 44 overlies the spring contact 40 and engages the same with a pair of electrical insulating blocks 46. The end of the lever 44 rides in a slot 47 formed in an upstanding plate 48 secured to the base plate 4. This slot limits upward movement of the lever 44 under the bias of the spring contact 40. Thus when the carriage is moved downwardly to toasting position the latch 42 engages the lever 44 and carries the same downwardly therewith against the bias of the contact 40 to move the switch 39 to closed circuit position to energize the heating element 36 for the thermostatic elements 31 and 32.

The thermostatic elements 31 and 32 as shown in Figure 1 are both in their cold positions. These elements are positioned in reversed relationship, that is, the high expansion side of the element 31, as viewed in Figure 1, faces the plate 9 so that the same flexes away from the plate 9 when heated. The thermostatic element 32 has its low expansion side facing the plate 9 so that the same flexes inwardly of the plane of the paper, as viewed in Figure 1, when heated.

As the thermostat 32 flexes under the influence of heat, its end strikes the inclined face of a wedge 50 which projects generally parallel to the base plate 4 from an upstanding lug 51 which is carried by an adjusting link 52. As shown more clearly in Figure 4, which is a view of this part of the mechanism looking from the bottom of Figure 2, a U-shaped plate 53 is secured to the base plate 4 of the toaster proper. The link 52 has a pin and slot connection 54 with one leg of the plate 53. The link 52 has an additional pin and slot connection 55 with a link 56 which is pivotally mounted at 57 on the cross bar of the U-shaped plate 53. The link 56 additionally has a pin and slot connection as indicated at 58 with the under side of a circular adjusting dial 59. Thus, as viewed in Figure 4, the link 52 has a limited arc of movement about the pin and slot connection 54 which arc is limited by the pin and slot connection 55. The pin of the pin and slot connection 58 is offset with respect to the center of the dial 59 so that rotation of dial 59 moves the link 52 laterally a distance limited by the extent of the slot in the pin and slot connection 54. The U-shaped element 53 has suitable offsets to provide clearance for the links 56 and 52 as well as the adjusting dial 59, see Figure 2.

The dial 59 is pivotally supported from the under side of plate 4 as indicated at 60 and projects through a slot 61 formed in the base 1 of the toaster so that the indicia marked upon the upper face of the dial 59 are visible to the operator. The edge of the dial may be grasped to change the adjustment of the toaster in a manner to be described hereinafter.

The lug 51 projects through a slot 63 formed in the plate 4 and is abutted at its rear or oven side by the secondary switch latch element 42. This positions the wedge 50 in the path of movement of the thermostatic element 32. The latch 42 urges the lug 51 into engagement with the edge of the slot 63 to position the lug and stop counter-clockwise movement of latch 42 when it is disengaged from the lever 44. When engaged by lever 44 the latch allows some clearance between lug 51 and the edge of slot 63. The distance which the thermostatic element 32 must move to cause its free end to engage the wedge element 50 is determined by the lateral position of the link 52 which is under the control of the dial 59. As the thermostat 32 flexes under the influence of heat it eventually strikes the wedge surface 50, pivots the same about pin and slot connection 54 against the latch 42 and ultimately releases the latch from engagement with the link 44. When this occurs the spring contact 40 opens the heater switch 39 and de-energizes the heating element 36. The position of the dial 59 determines the distance which thermostat 32 must flex under heat to open circuit switch 39 and this is the means by which the length of the toasting cycle may be varied at the will of the operator to vary the condition of the toast from light to dark.

When the heater 36 is de-energized the toasting operation continues, and the divergently flexed thermostats begin to cool and to flex inwardly to their central cold position.

The thermostat 31, in its cold position, underlies and supports a plate 65 which is slidably mounted by pin and slot connection 64 on a vertically positioned grooved plate 66.

The vertically extending plate 66 is a dependent portion of a bell crank 67 mounted on a pivot pin 68 which is carried by the latching lug 30. A torsion spring 69 urges the bell crank 67 in a clockwise direction, as viewed in Figure 1, against a stop 70 formed on the latch lug 30. A leaf spring 71 secured to the pivot pin 68 for the bell crank 67 urges the sliding plate 65 downwardly into engagement with the thermostatic element 31.

The thermostatic element 31 flexes out from under the plate 65 under the influence of heat as shown in Figure 3 in dotted lines and the plate 65 then drops downwardly into the path of movement of the thermostat 31. After the heater 36 is deenergized and the thermostat 31 begins to cool, it eventually strikes the side edge of the plate 65 and pivots the bell crank 67 against the latching end of the carriage latch 21 and disengages the same from contact with the latching lug 30. This releases the toast carriage to the spring 19 which raises the same to toast ejecting position and also opens the switch 28 to de-energize the entire toaster.

A schematic wiring diagram of the apparatus is shown in Figure 5 wherein the heating element for the toaster oven is indicated at 75. As shown in said figure, one side of the switch 28 is connected to the line conductor 76 and the other side to the heating element 75. The switch 28 is connected by conductor 37 to the auxiliary heating element 36 for the thermostats. The heating element 15 is connected to the line conductor 17 and the heating element 36 is connected to the line conductor 17 through conductor 38 and the switch 39. This shows the manner in which the auxiliary heating element 36 for the thermostats is de-energized without effecting the energization of the main heater 15.

As the thermostat 32 cools it allows the lever 51 and latch element 42 to return substantially to the position shown in Figure 3 under the bias of the torsion spring 43. At this time however the link 44 has been raised above the level of latch 42 under the influence of the spring contact 40 so the switch 39 remains in open circuit condition.

As the toast carriage raises under the bias of the spring 19, the latch release mechanism including the sliding plate 65 are raised therewith well above the level of the thermostats 31 and 32 and the plate 65 is then urged back into position above the upper edge of thermostat 31 by the torsion spring 69 as shown in Figures 1 and 3.

On the next succeeding toast cycle as the toast carriage is lowered by the handle 18, the link 44 is caught by the descending latch 42 and moves the switch 39 to closed circuit position, and the latch 21 engages the lug 30 to hold the carriage in its lower toasting position. This initiates a new cycle of operation of the toaster.

The present thermostatic mechanism is substantially self-compensating for the gradual increase in temperature in the toaster oven and in the control chamber 5, which occurs when the toaster is operated for several cycles successively. This gradual increase in the ambient inside the toaster normally causes a bimetallic thermostat to over-compensate, that is, if the thermostat is so constructed that it will correctly time the first toasting operation the increased ambient in the toaster will tend to cause the thermostat to shorten each succeeding cycle to too great an extent and thus cause the toast to be ejected before it has reached the required degree of brownness. With the present construction the increasing ambient in the toaster tends to shorten up the period required for the thermostat 32 to heat up to the point at which it releases the secondary latch which governs the energization of the heater for the thermostat. This introduces an actual over-compensation into the toasting mechanism, however, the increased ambient also slows down the cooling of the thermostat 31 which corrects the over-compensation of the thermostat 32 and causes the toaster to time the apparatus correctly for succeeding toasting cycles. The foregoing net compensation occurs in the following manner. There is a temperature gradient in the chamber 5 from the region immediately adjacent the partition wall 6 to the surface of the shell 2. This gradient is accentuated by air flowing into the chamber 5 through the opening 63 and other openings in the partition 4 indicated generally at 80. The common, cold, position of the thermostats 31—32 is a region of intermediate ambient temperature. As the thermostats are heated, thermostat 32 moves into a region of increasing ambient and thermostat 31 moves into a region of decreasing ambient. This factor tends to accentuate the over-compensating characteristic of thermostat 32 in that it facilitates rapid heating thereof. On the other hand, thermostat 31 moves into a region of increasing ambient as it cools and moves to position to terminate the toasting cycle. This factor tends to diminish the under-compensating characteristics obtained when a single thermostat is utilized to perform a timing function by cooling from a hot position to a cold position. The net effect of the foregoing factors is to shorten the toasting periods as they follow each other successively in close timed relationship which produces a gradual rise in the ambient at any given point in the chamber 5. By this means the timing mechanism is self-compensating and pieces of toast prepared in succeeding operations of the toaster are substantially identical.

While I have illustrated and described the invention in considerable detail, it is to be understood that various changes may be made in the arrangement, proportion and construction of parts without departing from the spirit of the invention or the scope of the appended claims.

I claim:

1. In a toaster, a toasting oven, heating means for said oven, a control chamber having a common wall with said oven, toasting operation control means in said chamber comprising a pair of thermostats supported in said chamber, one of said thermostats being arranged to deflect towards and way from said common wall as it heats and cools respectively, the other of said thermostats being arranged to deflect away from and toward said common wall, when it is heated and cooled respectively, means for heating said thermostats, means for initiating a toasting operation including means for energizing both of said heating means, means actuated by heat induced deflection of said one thermostat for de-energizing said thermostat heating means, and means actuated by deflection of said other thermostat induced by cooling subsequent to the deenergization of said thermostat heating means for de-energizing said oven heating means.

2. In a toaster, an oven, means for heating said oven, a control chamber adjacent said oven and having a common wall therewith, a pair of bimetallic thermostats, means supporting said thermostats in said chamber with lateral faces thereof facing said common wall, means for heating said thermostats, said thermostats being so mounted on said supporting means that one deforms in a direction to approach said wall when heated and the other deforms in a manner to recede from said wall when heated, a toasting control biased to non-toasting position, a latch for retaining said toasting control in toasting position, means operated by said toasting control when in toasting position for energizing said oven heating means, a switch controlling said thermostat heating means biased to open circuit position, a second latch for retaining said switch in closed circuit position, means for moving said toasting control and switch to latched position, means operated by heat induced movement of said one thermostat for releasing said second latch to de-energize said thermostat heating means, and means operated by said other thermostat moving from hot to cool position for releasing said first latch.

3. In a toaster, an oven, means for heating said oven, a control chamber adjacent said oven and having a common wall therewith, a pair of bimetallic thermostats, means supporting said thermostats in said chamber with lateral faces thereof facing said common wall, means for heating said thermostats, said thermostats being so mounted on said supporting means that one deforms in a direction to approach said wall when heated and the other deforms in a manner to recede from said wall when heated, a toasting control biased to non-toasting position, a latch for retaining said toasting control in toasting position, means operated by said toasting control when in toasting position for energizing said oven heating means, a switch controlling said thermostat heating means biased to open circuit position, a second latch for retaining said switch in closed circuit position, means for moving said toasting control and switch to latched position, means operated by heat induced movement of said one thermostat for releasing said second latch to de-energize said thermostat heating means, means operated by said other thermostat moving from hot to cool position for releasing said first latch, and manually operable means for adjusting said thermostat operated second latch releasing means to vary the relation between said thermostat and said second latch releasing means to alter the extent of the latch releasing movement of said one thermostat.

4. A timing mechanism for controlling a heating element comprising a means forming a timing mechanism chamber having a wall thereof subjected to heat from said heating element, a pair of thermal elements having a common cold position and hot positions which are removed from said cold position in opposite senses, means mounting said thermal elements in said chamber so that one deflects toward said wall and the other deflects away from said wall when heated, whereby said one thermal element deflects from said common position into a region of higher ambient temperature and said other thermal element deflects from said common position into a region of lower ambient temperature, means for heating said thermostats, means for energizing said heating means and said heating element to initiate a timing operation, means operated by said one thermostat when moving to its hot position for de-energizing said heating means, and means operated by said other thermostat moving from hot position to cold position for de-energizing said heating elements to terminate a timing operation.

5. In a toaster, an oven, means for heating said oven, a control chamber adjacent said oven and having a common wall therewith, a pair of bimetallic thermostats, means supporting said thermostats in said chamber with lateral faces thereof facing said common wall, means for heating said thermostats, said thermostats being so mounted on said supporting means that one deforms in a direction to approach said wall when heated and the other deforms in a manner to recede from said wall when heated, a toasting control biased to non-toasting position, a latch for retaining said toasting control in toasting position, means operated by said toasting control when in toasting position for energizing said oven heating means, a switch controlling said thermostat heating means biased to open circuit position, a second latch for retaining said switch in closed circuit position, means for moving said toasting control and switch to latched position, means operated by heat induced movement of said one thermostat for releasing said second latch to de-energize said thermostat heating means, means operated by said other thermostat moving from hot to cool position for releasing said first latch including an actuating member mounted on said toasting control in position to engage the top edge of said other thermostat in the cool position thereof when said toasting control is moved to toasting position, and means biasing said actuating member into the path of movement of said other thermostat whereby said actuating member moves into the path of movement of said other thermostat when said other thermostat is heated and deflects out of engagement with said actuating member.

WARREN A. HUMPHREY.

REFERENCES CITED

The following references are of record in the file of this patent:

UNITED STATES PATENTS

| Number | Name | Date |
|---|---|---|
| 2,076,774 | Graham | Apr. 13, 1937 |
| 2,162,899 | Sardeson | June 20, 1939 |
| 2,196,393 | Ireland | Apr. 9, 1940 |
| 2,234,764 | Ireland | Mar. 11, 1941 |
| 2,237,100 | Gomersall | Apr. 1, 1941 |
| 2,250,439 | Persons | July 22, 1941 |
| 2,250,997 | Miller | July 29, 1941 |
| 2,254,946 | Ireland | Sept. 2, 1941 |
| 2,260,838 | Lynch | Oct. 28, 1941 |
| 2,373,103 | Deubel | Apr. 10, 1945 |
| 2,388,641 | Myers | Nov. 6, 1945 |